United States Patent
Sindhu et al.

(10) Patent No.: US 7,359,321 B1
(45) Date of Patent: Apr. 15, 2008

(54) SYSTEMS AND METHODS FOR SELECTIVELY PERFORMING EXPLICIT CONGESTION NOTIFICATION

(75) Inventors: Pradeep Sindhu, Los Altos Hills, CA (US); Debashis Basu, San Jose, CA (US); Jayabharat Boddu, Santa Clara, CA (US); Avanindra Godbole, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1095 days.

(21) Appl. No.: 10/206,990

(22) Filed: Jul. 30, 2002

Related U.S. Application Data

(60) Provisional application No. 60/348,610, filed on Jan. 17, 2002.

(51) Int. Cl.
*G01R 31/08* (2006.01)

(52) U.S. Cl. ...................... 370/230; 370/235; 370/412; 710/52

(58) Field of Classification Search ...................... None
See application file for complete search history.

(56) References Cited

U.S. PATENT DOCUMENTS

| | | | |
|---|---|---|---|
| 6,108,307 A * | 8/2000 | McConnell et al. | 370/235 |
| 6,333,917 B1 * | 12/2001 | Lyon et al. | 370/236 |
| 6,535,482 B1 * | 3/2003 | Hadi Salim et al. | 370/229 |
| 6,690,645 B1 * | 2/2004 | Aweya et al. | 370/230 |
| 6,788,697 B1 * | 9/2004 | Aweya et al. | 370/412 |
| 6,904,015 B1 * | 6/2005 | Chen et al. | 370/235 |

OTHER PUBLICATIONS

Sally Floyd and Van Jacobson, "Random Early Detection Gateways for Congestion Avoidance," Lawrence Berkeley Laboratory, University of California, 1993, pp. 1-32.
K. Ramakrishnan and S. Floyd, "A Proposal to add Explicit Congestion Notification (ECN) to IP," Jan. 1999, pp. 1-23.

* cited by examiner

*Primary Examiner*—Bob A. Phunkulh
(74) *Attorney, Agent, or Firm*—Harrity Snyder, LLP

(57) ABSTRACT

A system provides congestion control and includes multiple queues that temporarily store data and a drop engine. The system associates a value with each of the queues, where each of the values relates to an amount of memory associated with the queue. The drop engine compares the value associated with a particular one of the queues to one or more programmable thresholds and selectively performs explicit congestion notification or packet dropping on data in the particular queue based on a result of the comparison.

40 Claims, 13 Drawing Sheets

SYSTEMS AND METHODS FOR SELECTIVELY PERFORMING EXPLICIT CONGESTION NOTIFICATION

RELATED APPLICATION

This application claims priority under 35 U.S.C. § 119 based on U.S. Provisional Application No. 60/348,610, filed Jan. 17, 2002, the disclosure of which is incorporated herein by reference.

BACKGROUND OF THE INVENTION

1. Field of the Invention

The present invention relates generally to congestion control during data transfer and, more particularly, to systems and methods for selectively performing explicit congestion notification.

2. Description of Related Art

Conventional network devices, such as routers, relay streams of data through a network from a source to a destination. Typically, the network devices include one or more memory subsystems to temporarily buffer data while the network devices perform network-related functions, such as route processing or accounting.

FIG. 1 is an exemplary diagram of a network 100 of routers partaking in a communication between a source and a destination. Suppose that a router (e.g., router 1) sends packets of data to another router (e.g., router N) via a path that includes a number of other routers (e.g., router 2, router 3, ..., router N−2, and router N−1). When destination router N receives a packet from source router 1, router N acknowledges the packet by sending an acknowledgement message back to source router 1. The acknowledgement message may go back to router 1 directly or through other routers.

Whenever a router (e.g., router N−1) detects congestion in network 100, router N−1 drops packets according to one conventional technique for alleviating congestion. When this happens, source router 1 may not become aware of the congestion until it fails to receive the acknowledgement message from destination router N. Router 1 maintains a timer that tracks the period during which it should receive an acknowledgement message from router N. When the timer expires without receipt of an acknowledgement message, router 1 determines that congestion exists along the path and slows further packet transmissions on the path.

A problem with this conventional technique is that network resources are wasted when packets are dropped. For example, the packet travels a portion of the way to its destination using network resources before it is dropped. This is especially troublesome when the packet makes it most of the way to destination router N.

A further problem with this technique is that once notified that a packet has been dropped, source router 1 must resend the packet. The resending of the packet uses additional network resources without the guarantee that the packet will make it to destination router N this time.

Another technique for alleviating congestion uses explicit congestion notification (ECN). ECN involves the use of a tag in packets to explicitly inform the sender of congestion. In particular, each of the packets sent from a source (e.g., router 1) to a destination (e.g., router N) includes a tag that includes 8 bits. FIG. 2 is an exemplary diagram of a tag. The tag includes a differentiation of service (diffserv) field, an ECN capable (ECT) field, and a congestion experienced (CE) field. The diffserv field is used for assuring quality of service (QoS). The ECT field indicates whether the router (e.g., source router 1) is capable of handling ECN. The CE field indicates whether a router (e.g., router N−2) is experiencing congestion. The ECT and CE fields (bits) may not have fixed field locations. If only one of the two bits is set, it is assumed to be ECT. If both bits are set, it is assumed that both ECT and CE are set.

Suppose that a router (e.g., router 3) receives a packet sent from source router 1 to destination router N. Suppose further that router 3 is experiencing congestion. When the packet arrives, router 3 determines whether source router 1 has indicated that it is capable of handling ECN by checking the two bit fields reserved for ECT and CE in the tag. If so, router 3 may set the CE bit to indicate that congestion exists. Unlike other conventional techniques, router 3 does not drop the packet, but sends it along its path to destination router N.

When destination router N receives the packet, router N knows that there is congestion in the network based on the CE bit. Router N then sends an acknowledgement message that includes the CE information to source router 1. In response to the congestion, router 1 slows down its transmission of packets to destination router N. This improves the network utilization because packets did not get dropped. Also, the congestion notification gets to the sender (e.g., source router 1) quicker because the sender did not need to wait for a timeout to determine that there is congestion.

A problem occurs when the sender purposefully attempts to disrupt the network, such as by performing a denial of service (DoS) attack. If an attacking router (e.g., router 1) sets the ECT field to indicate that it is capable of handling ECN, then no matter what happens to the packet during its transmission along the path from router 2 to router N, no router along that path will drop the packet. Therefore, source router 1 may bombard destination router N with packets, thereby flooding the network.

As a result, there is a need for congestion alleviation techniques that also preclude attacks to the network.

SUMMARY OF THE INVENTION

Systems and method consistent with the principles of the invention address this and other needs by providing congestion alleviation mechanisms that selectively use and/or combine explicit congestion notification (ECN) and packet dropping techniques. These mechanisms use one or more programmable thresholds that determine whether to use ECN or packet dropping techniques. By choosing the appropriate threshold(s), attacks on the network may be avoided.

In accordance with the principles of the invention as embodied and broadly described herein, a system provides congestion control and includes multiple queues that temporarily store data and a drop engine. The system associates a value with each of the queues, where each of the values relates to an amount of memory associated with the queue. The drop engine compares the value associated with a particular one of the queues to one or more programmable thresholds and selectively performs explicit congestion notification or packet dropping on data in the particular queue based on a result of the comparison.

In another implementation consistent with the principles of the invention, a network device includes a switching fabric, first and second processors, and a memory subsystem. The first processor receives data from a network and transmits data to the network. The second processor receives data from the switching fabric and transmits data to the switching fabric. The memory subsystem facilitates communication between the first processor and the second processor. The memory subsystem includes multiple queues, a dequeue engine, and a drop engine. The queues temporarily store the data received by the first and second processors. A value is associated with each of the queues, where each of the values relates to an amount of memory associated with the queue. The dequeue engine dequeues data from the queues. The drop engine compares the value associated with a particular one of the queues to multiple programmable thresholds and selectively performs explicit congestion notification or packet dropping on data in the particular queue based on a result of the comparison.

In yet another implementation consistent with the principles of the invention, a method for selectively performing explicit congestion notification or packet dropping on data stored in one of multiple queues is provided. The method includes determining an amount of memory associated with the queue; generating a value based on the amount of memory associated with the queue; comparing the value to a programmable threshold; performing explicit congestion notification on the data when the value is less than or equal to the programmable threshold; and selectively dropping the data when the value is greater than the programmable threshold.

In a further implementation consistent with the principles of the invention, a device for performing congestion control includes multiple queues that temporarily store data and a drop engine. The drop engine determines an amount of memory associated with a first one of the queues, generates a value based on the amount of memory associated with the first queue, and compares the value to first and second programmable thresholds. The drop engine performs no explicit congestion notification or packet dropping on the data in the first queue when the value is less than or equal to the first threshold, performs selective explicit congestion notification on the data in the first queue when the value is greater than the first threshold but less than or equal to the second threshold, and selectively drops the data in the first queue when the value is greater than the second threshold.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the recited claim limitations.

Systems and methods consistent with the principles of the invention selectively use and/or combine explicit congestion notification (ECN) and packet dropping techniques for congestion control in a network. The systems and methods provide one or more programmable thresholds that determine whether to use ECN or packet dropping techniques. The threshold(s) may be set such that packet dropping techniques are used during times of high bandwidth use, such as during an attack on the network.

Exemplary Network Device Configuration

Figure 3:
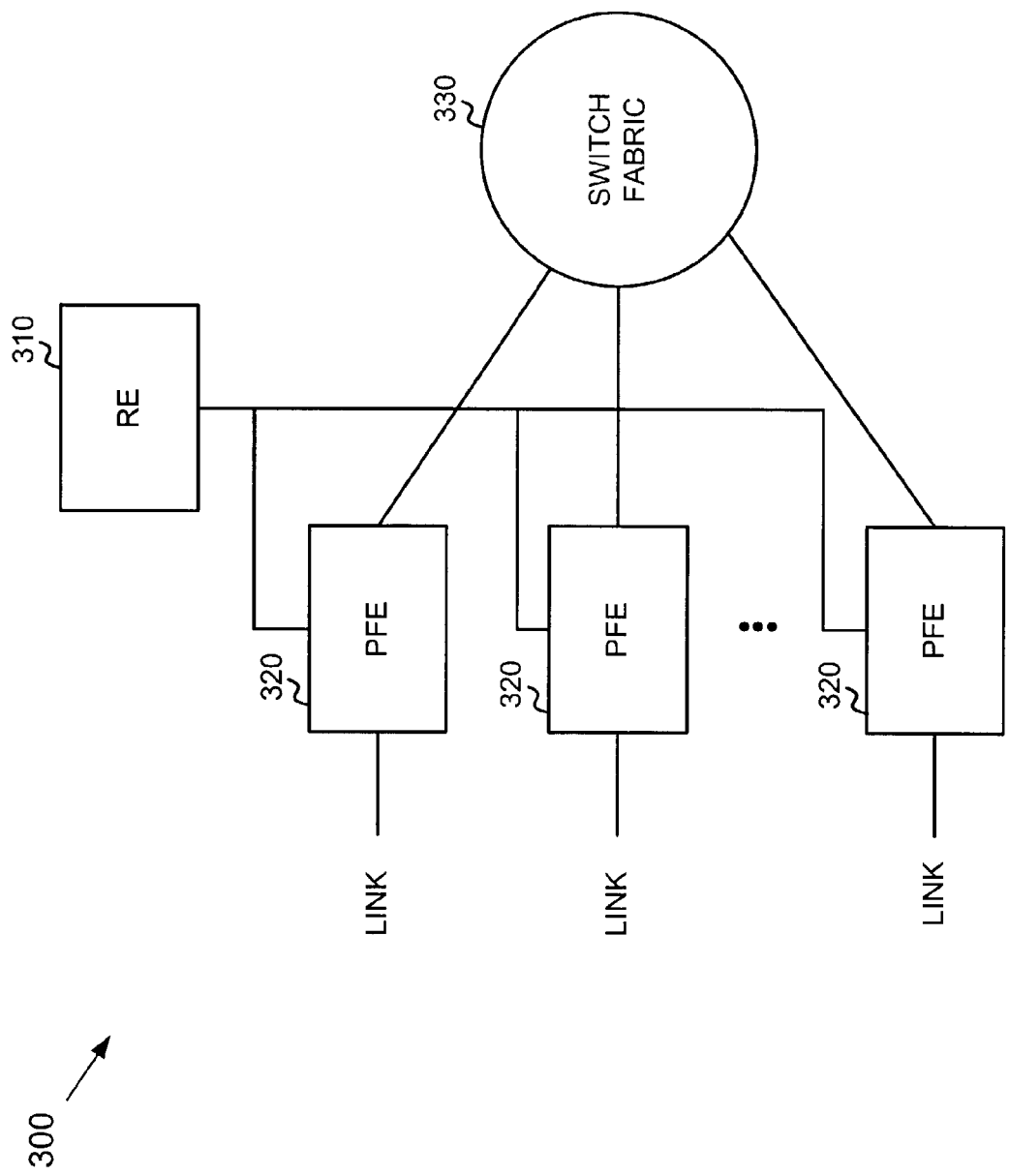
FIG. 3 is an exemplary network device in which systems and methods consistent with the principles of the invention may be implemented.

FIG. 3 is a diagram of an exemplary network device in which systems and methods consistent with the principles of the invention may be implemented. In this particular implementation, the network device takes the form of a router 300. Router 300 may receive one or more packet streams from a physical link, process the stream(s) to determine destination information, and transmit the stream(s) on one or more links in accordance with the destination information.

Router 300 may include a routing engine (RE) 310 and multiple packet forwarding engines (PFEs) 320 interconnected via a switch fabric 330. Switch fabric 330 may include one or more switching planes to facilitate communication between two or more of PFEs 320. In an implementation consistent with the principles of the invention, each of the switching planes includes a single or multi-stage switch of crossbar elements.

RE 310 performs high level management functions for router 300. For example, RE 310 may communicate with other networks and systems connected to router 300 to exchange information regarding network topology. RE 310 creates routing tables based on network topology information, creates forwarding tables based on the routing tables, and sends the forwarding tables to PFEs 320. PFEs 320 use the forwarding tables to perform route lookup for incoming packets. RE 310 also performs other general control and monitoring functions for router 300.

Each of PFEs 320 connects to RE 310 and switch fabric 330. PFEs 320 receive packets on physical links connected to a network, such as a wide area network (WAN), a local area network (LAN), etc. Each physical link could be one of many types of transport media, such as optical fiber or Ethernet cable. The packets on the physical link are formatted according to one of several protocols, such as the synchronous optical network (SONET) standard or Ethernet.

Figure 4:
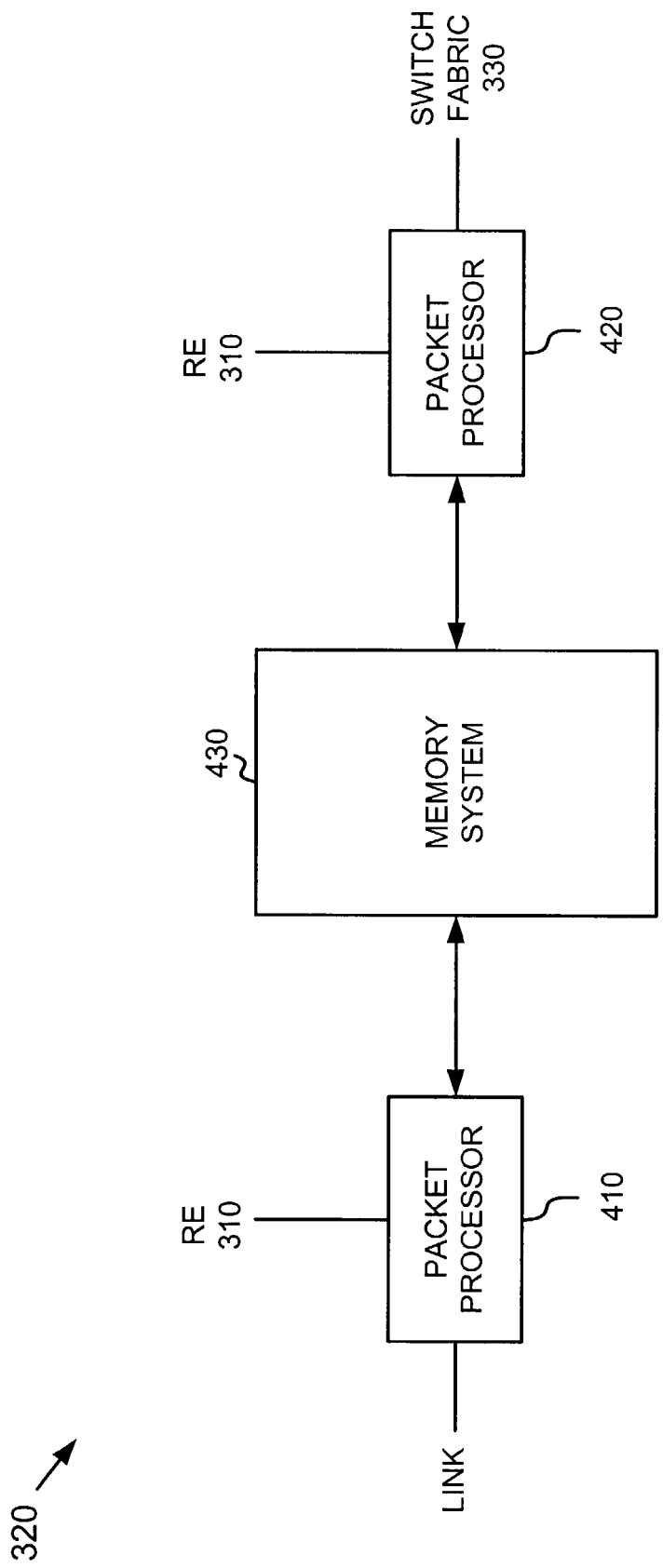
FIG. 4 is an exemplary diagram of a packet forwarding engine (PFE) of FIG. 3 according to an implementation consistent with the principles of the invention.

FIG. 4 is an exemplary diagram of a PFE 320 according to an implementation consistent with the principles of the invention. PFE 320 may include two packet processors 410 and 420, each connected to a memory system 430 and RE 310. Packet processors 410 and 420 communicate with RE 310 to exchange routing-related information. For example, packet processors 410 and 420 may receive forwarding tables from RE 310, and RE 310 may receive routing information from packet processor 410 that is received over the physical link(s). RE 310 may also send routing-related information to packet processor 410 for transmission over the physical link(s).

Packet processor 410 connects to one or more physical links. Packet processor 410 may process packets received from the incoming physical links and prepare packets for transmission on the outgoing physical links. For example, packet processor 410 may perform route lookup based on packet header information to determine destination information for the packets. For packets received from the incoming links, packet processor 410 may store data in memory system 430. For packets to be transmitted on the outgoing links, packet processor 410 may read data from memory system 430.

Packet processor 420 connects to switch fabric 330. Packet processor 420 may process packets received from switch fabric 330 and prepare packets for transmission to switch fabric 330. For packets received from switch fabric 330, packet processor 420 may store data in memory system 430. For packets to be transmitted to switch fabric 330, packet processor 420 may read data from memory system 430.

Figure 5:
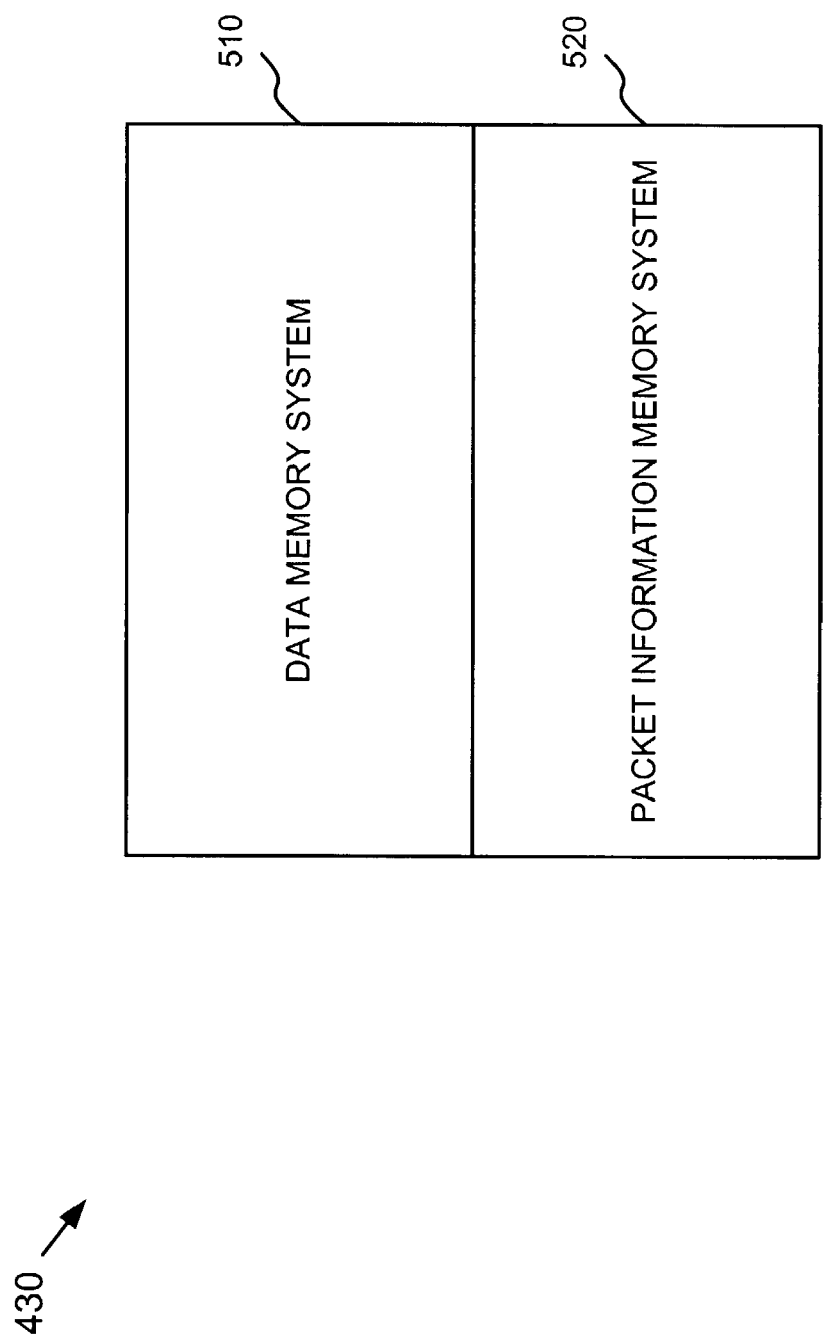
FIG. 5 is an exemplary diagram of a portion of the memory of FIG. 4 according to an implementation consistent with the principles of the invention.

Packet processors 410 and 420 may store packet data and other packet information, such as control and/or address information, within separate portions of memory system 430. FIG. 5 is an exemplary diagram of a portion of memory system 430 according to an implementation consistent with the principles of the invention. In FIG. 5, memory system 430 includes a data memory system 510 and a packet information memory system 520. Data memory system 510 may store the data from a packet, possibly in non-contiguous locations. Packet information memory system 520 may store the corresponding packet information in queues based on, for example, the packet stream to which the packet information corresponds. Other information, such as destination information and type of service (TOS) parameters for the packet, may be used in determining the particular queue(s) in which to store the packet information.

Figure 6:
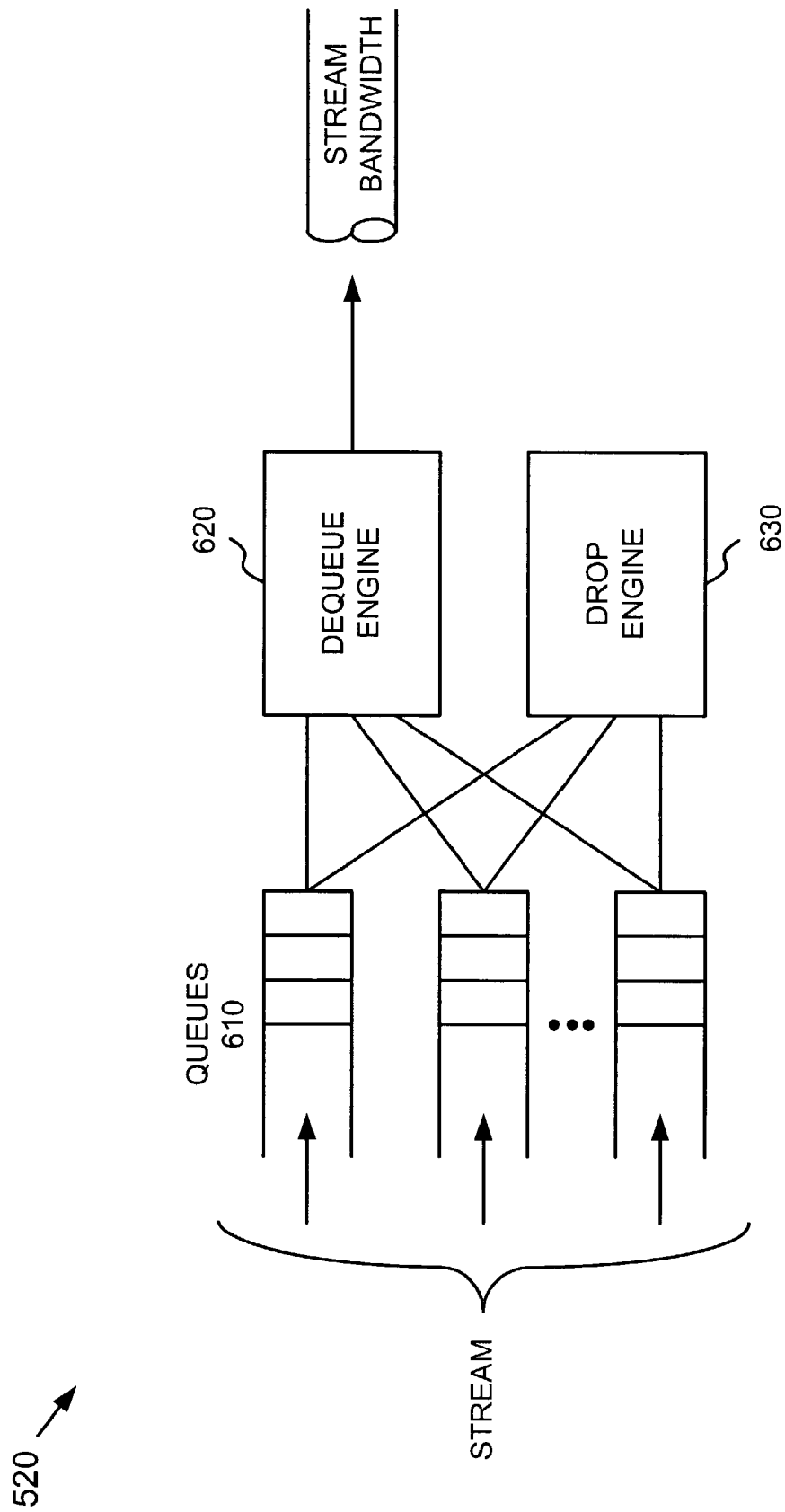
FIG. 6 is an exemplary diagram of a portion of the packet information memory of FIG. 5 according to an implementation consistent with the principles of the invention.

FIG. 6 is an exemplary diagram of a portion of packet information memory system 520 according to an implementation consistent with the principles of the invention. In FIG. 6, packet information memory system 520 includes queues 610, dequeue engine 620, and drop engine 630. In addition, memory system 520 may include an enqueue engine (not shown) that stores data in queues 610.

Packet information memory system 520 may concurrently store packet information corresponding to multiple, independent packet streams. In an implementation consistent with the principles of the invention, memory system 520 may contain separate queues 610, dequeue engines 620, and drop engines 630 corresponding to each of the packet streams. In other implementations, dequeue engine 620 and drop engine 630 may service multiple streams.

Queues 610 may include a group of first-in, first-out (FIFO) buffers that corresponds to a single stream. Other queues (not shown) may be provided for other packet streams. Queues 610 share the bandwidth of a single packet stream. In one implementation, each of queues 610 is allocated a static amount of packet information memory system 520 at configuration time. The amount of packet information memory system 520 allocated to a particular queue may be determined based on factors, such as the round trip time (Rtt), delay, and bandwidth associated with the stream, that minimize the chance that the queue will overflow.

Each of queues 610 may have three parameters associated with it: a weight between 0 and 1, a priority PR parameter that is either HI or LO, and a rate-control RC parameter that is either ON or OFF. A queue's weight determines the fraction of the stream's bandwidth B that is statically allocated to the queue. For a queue with weight w, the statically allocated bandwidth sba is equal to w*B. The sum of the weights of the queues (e.g., queues 610) for a stream equal one. In other words, the entire bandwidth of a stream is allocated to the queues associated with that stream.

The PR parameter specifies which of two priority levels (HI or LO) is associated with a queue. In other implementations, there may be more than two priority levels. Queues 610 associated with a HI priority may be serviced before queues 610 associated with a LO priority. Queues 610 at the same priority level may, for example, be serviced in a round robin manner.

The RC parameter determines whether a queue is allowed to oversubscribe (i.e., output more packet information than its statically allocated bandwidth). If RC is OFF, then the queue is permitted to send up to the stream bandwidth B (the total bandwidth for the stream). If RC is ON, then the queue is rate controlled and not permitted to send more than its statically allocated bandwidth sba.

Each of queues 610 is allocated a particular portion of data memory system 510 that stores packet data corresponding to the packet information stored by the queue. The size of the portion of data memory system 510 allocated to a particular queue (referred to as the static memory allocated sma) may be determined based on the stream's static bandwidth. For example, the sma may be defined as the round trip time (Rtt, which is defined as the maximum time allowed for a packet to travel from the source to the destination and send an acknowledgment back) multiplied by the statically allocated bandwidth sba. The statically allocated bandwidth sba was defined above. In another implementation, the sma may also take into account the speed of the stream.

The bandwidth allocated to a stream is fixed at B even though different queues within the stream may have dynamically changing bandwidth utilization. The stream itself never needs more than Rtt*B of data memory system 510. This amount of data memory system 510 may be denoted by MA.

A delay bandwidth buffer is an amount of packet information memory system 520 equal to the network round trip time (Rtt) multiplied by the sum of the bandwidths of the output interfaces. An efficient way to allocate the delay bandwidth buffer is to share it dynamically among queues across all output interfaces.

Dequeue engine 620 may include logic that dequeues packet information from queues 610. The order in which the streams are examined by dequeue engine 620 is referred to as the service discipline. For example, the service discipline may include round robin or time division multiplexing techniques. For each examination of a stream, dequeue engine 620 may select one of queues 610 and dequeue packet information from it. To select the queue, dequeue engine 620 may use the queue parameters w, PR, and RC. For each dequeue operation, the corresponding packet data in data memory system 510 may be read out and processed.

Drop engine 630 may include random early drop (RED) logic that controls the amount of data memory system 510 used by queues 610 such that the average latency through queues 610 remains small even in the presence of congestion. The drop process is profiled in the sense that the probability of a packet information drop is not fixed, but is a user-specifiable function that may take into account how congested a queue is. Drop engine 630 uses a combination of packet drop and ECN techniques to alleviate congestion and avoid attacks, such as denial of service (DoS) attacks.

Drop engine 630 makes its drop decision based on the state of queues 610, not on the state of the stream. Drop engine 630 may operate in a round robin fashion on all of the active queues. By design, drop engine 630 has a higher probability of examining more active queues rather than inactive queues to keep up with the data rate of a quickly-filling queue.

The drop decision is made at the head of queues 610 rather than at the tail, as in conventional systems. A benefit of dropping at the head of queues 610 is that congestion is signaled earlier to traffic sources, thereby providing tighter latency control. By comparison, a tail drop can result in the congestion signal being delayed by as much as Rtt compared to a head drop because a more recent packet is being dropped whose response time-out will expire later. Also, if queues 610 are allowed to oversubscribe and use more memory than allocated to them, then head drop provides a way to cut back excess memory use when a queue's bandwidth suddenly drops because a previously inactive queue has started to use its share of the bandwidth again.

Figure 7:
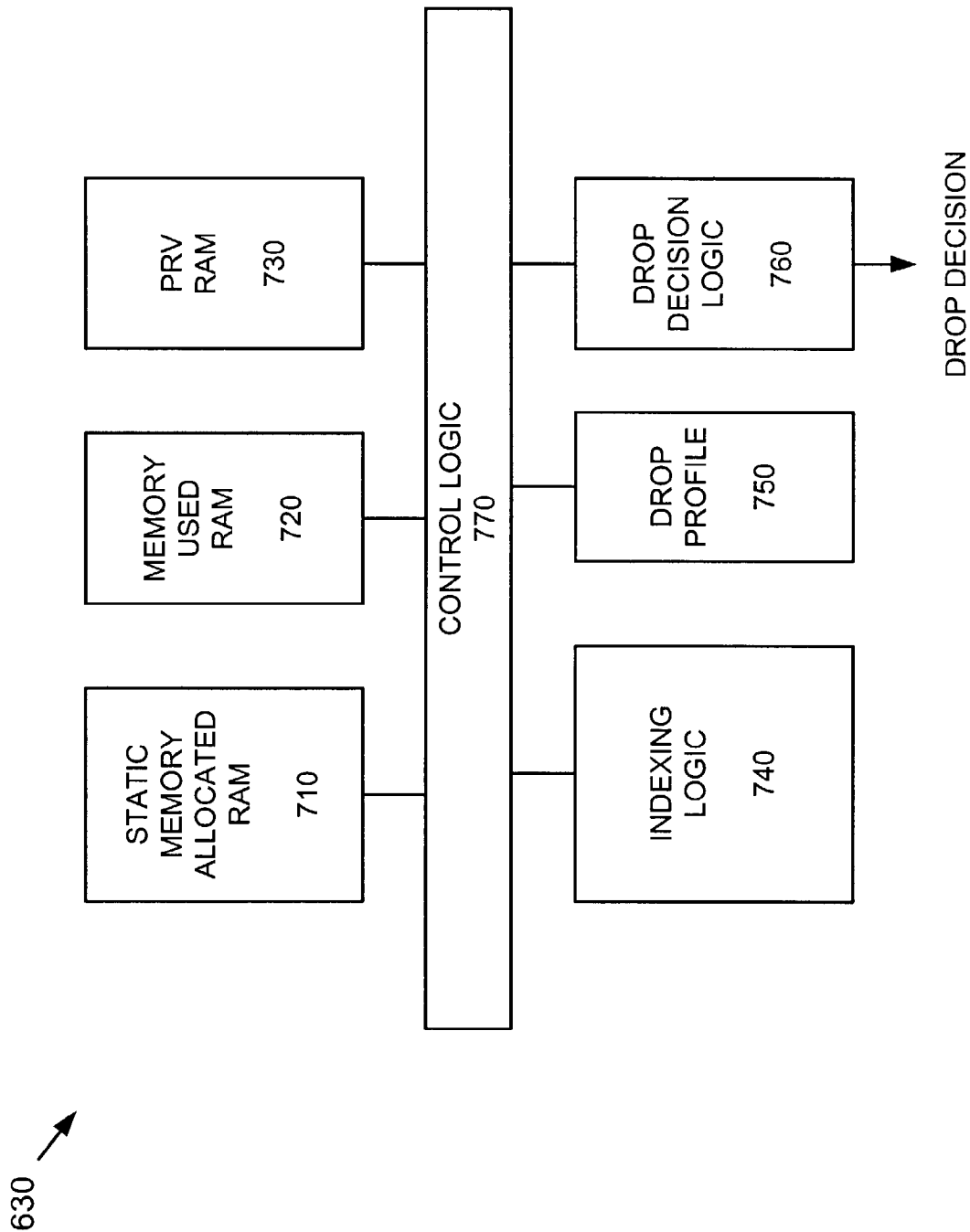
FIG. 7 is an exemplary diagram of the drop engine of FIG. 6 according to an implementation consistent with the principles of the invention.

FIG. 7 is an exemplary diagram of drop engine 630 according to an implementation consistent with the principles of the invention. Drop engine 630 may include static memory allocated RAM 710, memory used RAM 720, pending RED visit (PRV) RAM 730, indexing logic 740, drop profile 750, drop decision logic 760, and control logic 770. Control logic 770 may include logic that coordinates or facilitates the operation of the components of drop engine 630. For example, control logic 770 may perform calculations, write or read to or from the RAMs, or simply pass information between components of drop engine 630. In an alternate implementation static memory allocated RAM 710, memory used RAM 720, and PRV RAM 730 are registers within one or more memory devices, such as a flip-flop.

Static memory allocated RAM 710 may include multiple entries, such as one entry per queue. Each of the entries may store the variable sma, corresponding to the queue, that identifies the amount of data memory system 510 that should be made available to the queue (in the case where it is not allowed to oversubscribe due to RC being set or all of the other queues using their allocated bandwidth and, thereby, sparing no unused bandwidth). As defined above, sma is defined as the round trip time Rtt multiplied by the statically allocated bandwidth sba.

Memory used RAM 720 may include multiple entries, such as one entry per queue. Each of the entries may store a variable mu that represents the amount of data memory system 510 actually being used by the queue. Storage space within data memory system 510 may be allocated dynamically at the time a packet is received and reclaimed at some time after the packet is transmitted by router 300. The variable mu, which counts bytes or cells (e.g., 64 byte data blocks) of data, may be used to track the amount of data memory system 510 used by the queue. When packet information is enqueued, the mu value may be incremented by the length of the corresponding packet. When packet information is dequeued by dequeue engine 620 or dropped by drop engine 630, the mu value may be decremented by the length of the corresponding packet.

PRV RAM 730 may include multiple entries, such as one entry per queue. Each of the entries may store a variable prv that controls how many times the queue will be examined by drop engine 630. When packet information is enqueued, the prv value may be incremented by one. When packet information is dequeued by dequeue engine 620 or an examination of the queue by drop engine 630 occurs, the prv value may be decremented by one, if the prv value is greater than zero. The goal is to allow drop engine 630 to visit each packet at the head of the queue just once. A queue visited once may not be visited again unless the packet just got dropped or the packet gets dequeued by dequeue engine 620.

Indexing logic 740 may include logic for creating an index into drop profile 750. Drop profile 750 may include a memory that includes multiple addressable entries. Each of the entries may store a value that indicates the probability of a drop. For example, assume that drop profile 750 includes 64 entries that are addressable by a six bit address (or index). In an implementation consistent with the principles of the invention, each of the entries includes an eight bit number representing a drop probability. The drop probability may always be greater than or equal to zero.

Indexing logic 740 may generate the index into drop profile 750 using, for example, the expression:

$$\text{index} = (mu/\text{MAX})^*K,$$

where MAX is the maximum of the values of sma (static memory allocated) and dma (dynamic memory allocated, which is the amount of data memory system 510 that should be made available to a particular queue and is defined as the average bandwidth used bu*(Rtt/Ta)) and K is an integer relating to the number of entries in drop profile 750 (e.g., 64). The variable bu may represent a time-averaged measurement of the bandwidth used by a queue during the time interval Ta. The index may be considered a dynamic index because its value may change based on changes to the variable dma. In an alternate implementation, indexing logic 740 may generate a static index using, for example, the expression:

$$\text{index} = (mu/sma)^*K.$$

This may be considered a static index because the value of sma will not change. According to an implementation consistent with the principles of the invention, the index generated is a six bit value. In other implementations, other size indexes are possible.

If the situation occurs where mu becomes greater than MAX, then the ratio of mu/MAX results in a value larger than one. When this happens, the index may contain a value that points to somewhere outside drop profile 750. In this case, drop decision logic 760 may consider this a must drop situation and drop the packet unless the packet contains an attribute, such as a keep alive attribute, that indicates that the packet should not be dropped.

In some situations, an index threshold may be used. The index threshold may be set, such that if the index value generated by indexing logic 740 is less than the threshold value, the lookup in drop profile 750 may be skipped and the packet not dropped.

In another implementation consistent with the principles of the invention, packet attributes, such as the packet's Transmission Control Protocol (TCP) and/or Packet Level Protocol (PLP), may be used in conjunction with the index as an address into drop profile 750. In this case, drop profile 750 may include multiple profile tables, each having multiple addressable entries. The packet attributes may be used to select among the profile tables. For example, two bits representing the TCP and PLP of a packet may be used to select among four different profile tables in drop profile 750. The index may then be used to identify an entry within the selected table. In this way, a certain set of attributes extracted from the packets may be used to perform an intelligent drop.

Figure 8:
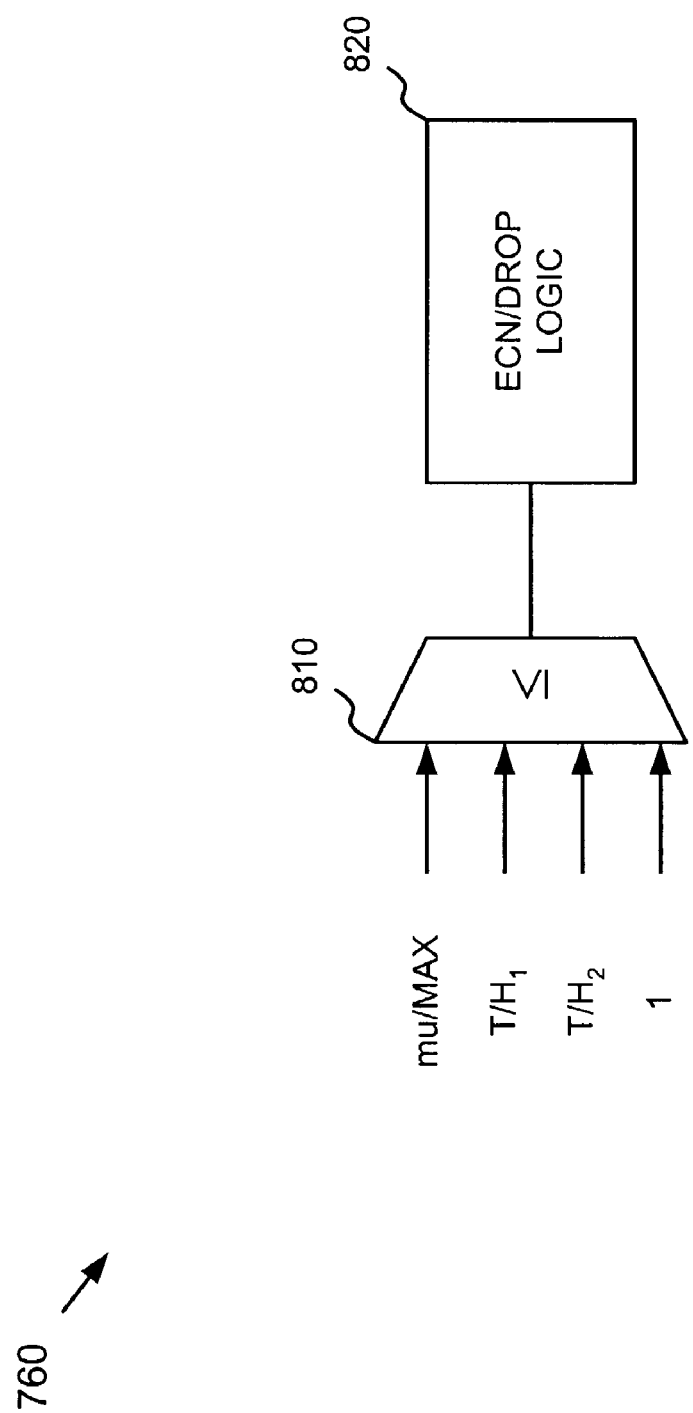
FIG. 8 is an exemplary diagram of drop decision logic of FIG. 7 according to an implementation consistent with the principles of the invention.

Drop decision logic 760 may include logic that makes the ultimate drop decision based, in part, on the drop probability in drop profile 750 and one or more programmable thresholds or other factors as described above. FIG. 8 is an exemplary diagram of drop decision logic 760 according to an implementation consistent with the principles of the invention. Drop decision logic 760 includes comparator 810 and ECN/drop logic 820. Comparator 810 may compare mu/MAX generated by indexing logic 740 to one or more values, such as a first programmable threshold ($T/H_1$), a second programmable threshold ($T/H_2$), and a value of one (1). The thresholds may be maintained as a percentage of the total allowable memory, which is MAX. Comparator 810 may generate an output signal based on a result of the comparison.

ECN/drop logic 820 may operate based on the output signal from comparator 810. Generally, if mu/MAX is less than or equal to $T/H_1$, then ECN/drop logic 820 may perform no packet dropping or ECN. If mu/MAX is greater than $T/H_1$ but less than or equal to $T/H_2$, then ECN/drop logic 820 may perform selective ECN. If mu/MAX is greater than $T/H_2$ but less than 1, then ECN/drop logic 820 may perform selective packet dropping. If mu/MAX is greater than or equal to 1, then ECN/drop logic 820 may perform packet dropping.

Figure 9:
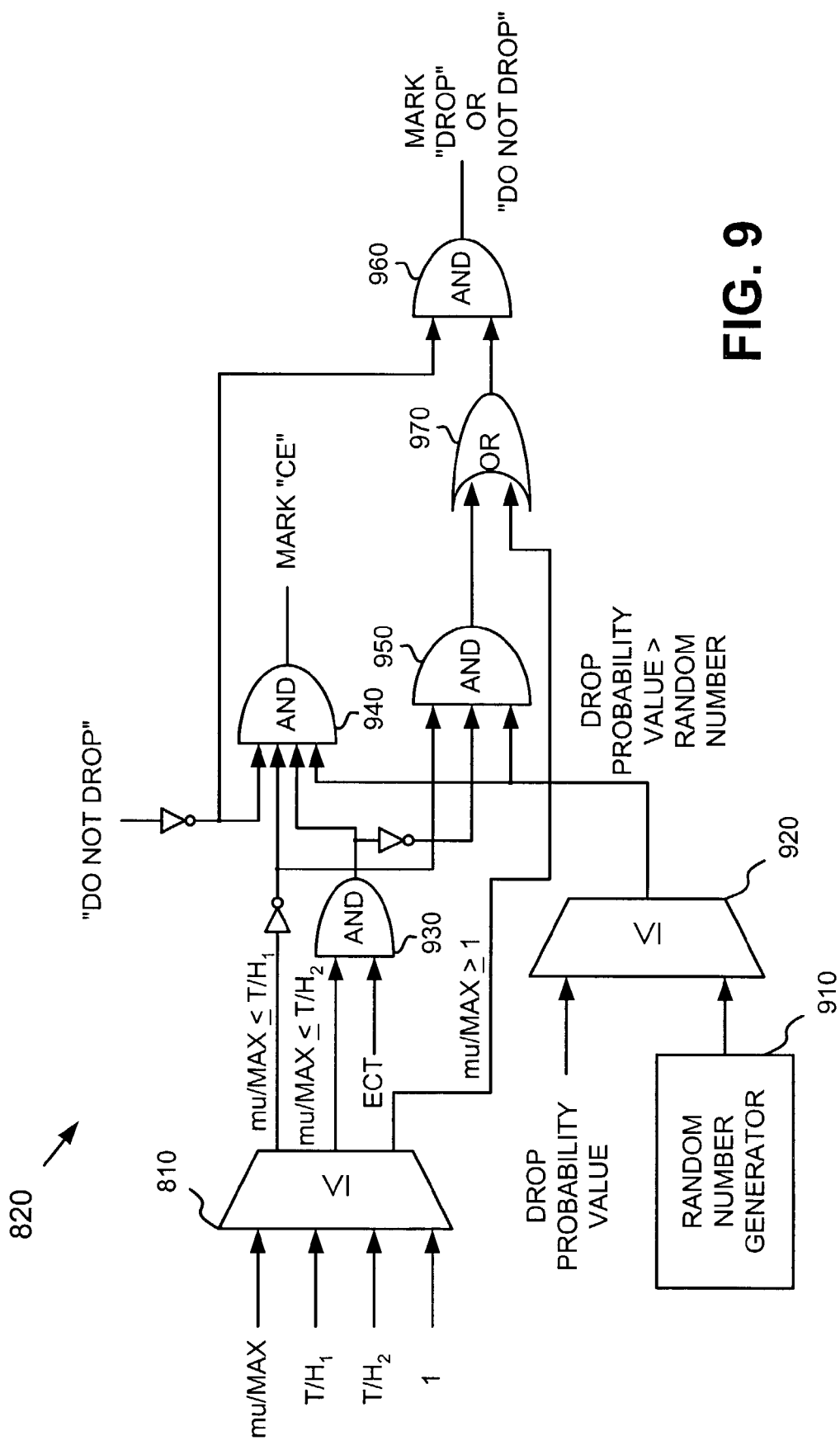
FIG. 9 is an exemplary diagram of the ECN/drop logic of FIG. 8 according to an implementation consistent with the principles of the invention.

FIG. 9 is an exemplary diagram of a portion of ECN/drop logic 820 according to an implementation consistent with the principles of the invention. ECN/drop logic 820 includes random number generator 910, comparator 920, AND gates 930-960, and OR gate 970. Random number generator 910 may include a pseudo random number generator, such as a linear feedback shift register that creates a pseudo random number that has a uniform distribution between zero and one. Random number generator 910 may generate a random number that has the same number of bits as the drop probability value from drop profile 750. To increase randomness, however, random number generator 910 may generate a random number that has a greater number of bits than the drop probability value from drop profile 750.

Comparator 920 may compare the random number from random number generator 910 to the drop probability value from drop profile 750. AND gate 930 may perform a logical AND operation on an output of comparator 810 and the ECT bit. AND gate 940 may perform a logical AND operation on an output of comparator 810, the output of comparator 920, the output of AND gate 930 and a "DO NOT DROP" signal, which may be generated based on the presence or absence of an attribute, such as a keep alive attribute, that may be extracted from the packet. A "DO NOT DROP" packet may include a network protocol packet that is necessary to keep the network up. As a result, they cannot be dropped by drop engine 630. The output of AND gate 940 may indicate whether one or more bits (e.g., CE bit) in the packet should be set to indicate that congestion exists.

AND gate 950 may perform a logic AND operation on an output of comparator 810, the output of comparator 920, and the output of AND gate 930. OR gate 970 may perform a logic OR operation on an output of comparator 810 and the output of AND gate 950. AND gate 960 may perform a logical AND operation on the DO NOT DROP signal and the output of OR gate 970. The output of AND gate 960 may indicate whether to mark the packet as "to be dropped" or "not to be dropped."

Figure 10:
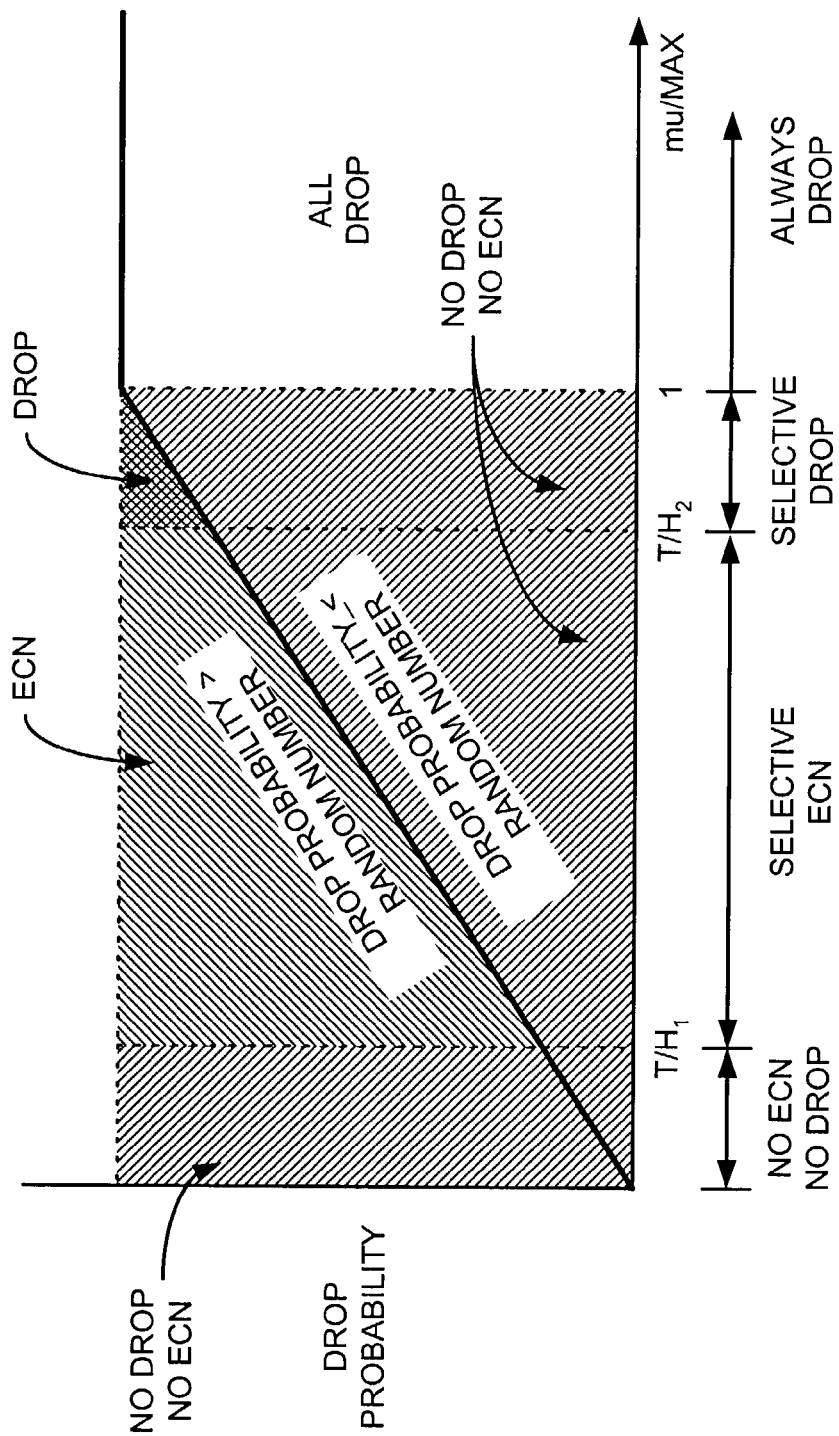
FIG. 10 is an exemplary graph of a drop profile consistent with the principles of the invention.

FIG. 10 is an exemplary graph of a drop profile consistent with the principles of the invention. As shown by the graph, the drop profile is a monotonically non-decreasing function. If mu/MAX is less than or equal to the first programmable threshold ($T/H_1$), no packet dropping or ECN is performed. If mu/MAX is greater than $T/H_1$ but less than or equal to $T/H_2$, then selective ECN is performed based on whether the random number is less than the drop probability value. If mu/MAX is greater than $T/H_2$ but less than 1, then selective packet dropping is performed based on whether the random number is less than the drop probability value. If mu/MAX is greater than or equal to 1, then packet dropping is performed.

Exemplary Processing

Figure 11A:
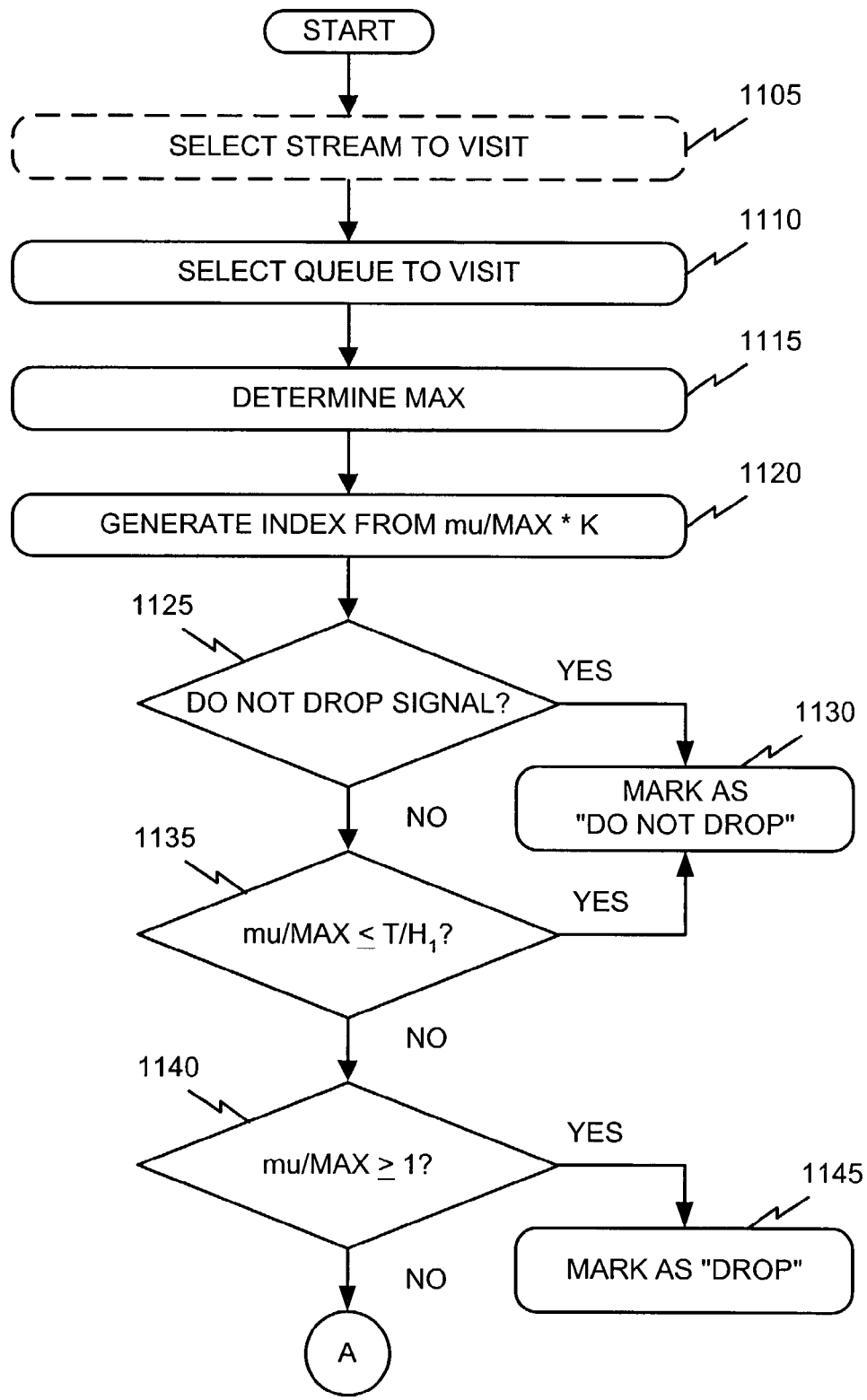
FIGS. 11A and 11B are flowcharts of exemplary processing by the drop engine of FIG. 7 according to an implementation consistent with the principles of the invention.
Figure 11B:
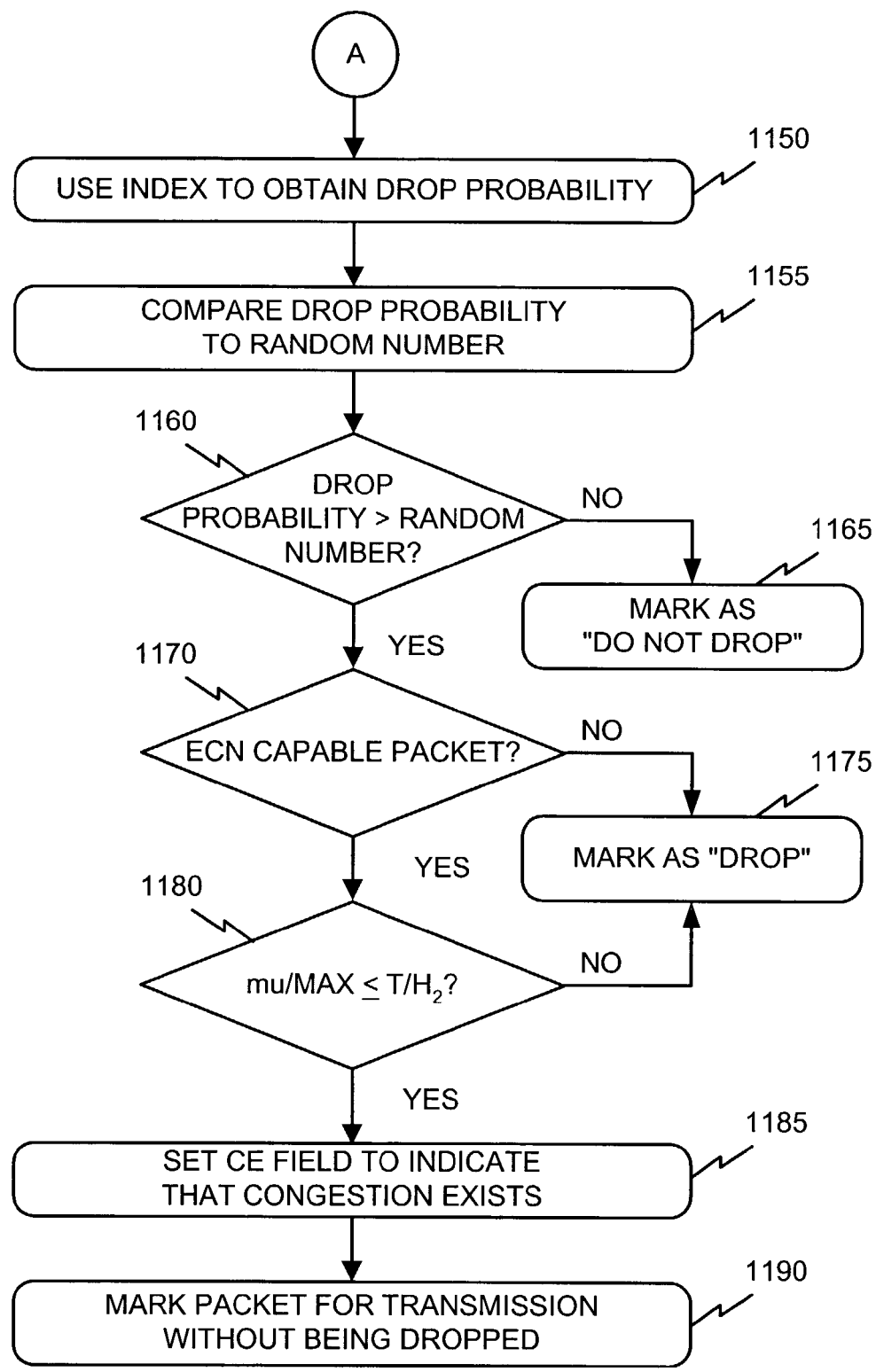

FIGS. 11A and 11B are flowcharts of exemplary processing by drop engine 630 according to an implementation consistent with the principles of the invention. Drop engine 630 may operate in parallel to dequeue engine 620. Therefore, packet information memory system 520 may include mechanisms to arbitrate between drop engine 630 and dequeue engine 620 competing for the same resource (i.e., the same packet information at the head of a queue). In implementations consistent with the principles of the invention, drop engine 630 and dequeue engine 620 may be permitted to access different packet information on the same queue.

Optionally, drop engine 630 may select a stream to examine (act 1105) (FIG. 11A). For example, drop engine 630 may use a round robin technique to determine which of the possible streams to examine next. Alternatively, in another implementation, drop engine 630 may consider all of the queues in a round robin manner without first selecting a stream. In this case, act 1105 may be unnecessary.

Once a stream has been selected, if necessary, drop engine 630 may select a queue to examine based on, for example, the queues' prv values (act 1110). Drop engine 630 may use round robin arbitration to select the next queue with a prv value greater than zero.

Alternatively, drop engine 630 may construct two bit vectors (HIVec and LOVec) and perform a round robin over these vectors to select the next queue to examine. The HIVec and LOVec vectors may be defined as follows:

```
for queue_i, where i = 0 to total number of queues:
    if (mu_i > MAX_i), HIVec[i] = 1;
    else {
        if (mu_i < MAX_i/X), LOVec[i] = 0;
        else LOVec[i] = (prv[i] > 0)
    }
```

Where X is an integer, such as 16. This conserves drop engine 630 examinations of a queue when mu is small compared to MAX and forces drop engine 630 examinations when mu exceeds MAX/X. When mu is very small compared to MAX, the drop probability will be small by default. Keeping LOVec reset allows drop engine 630 to visit other more active queues.

Figure 12:
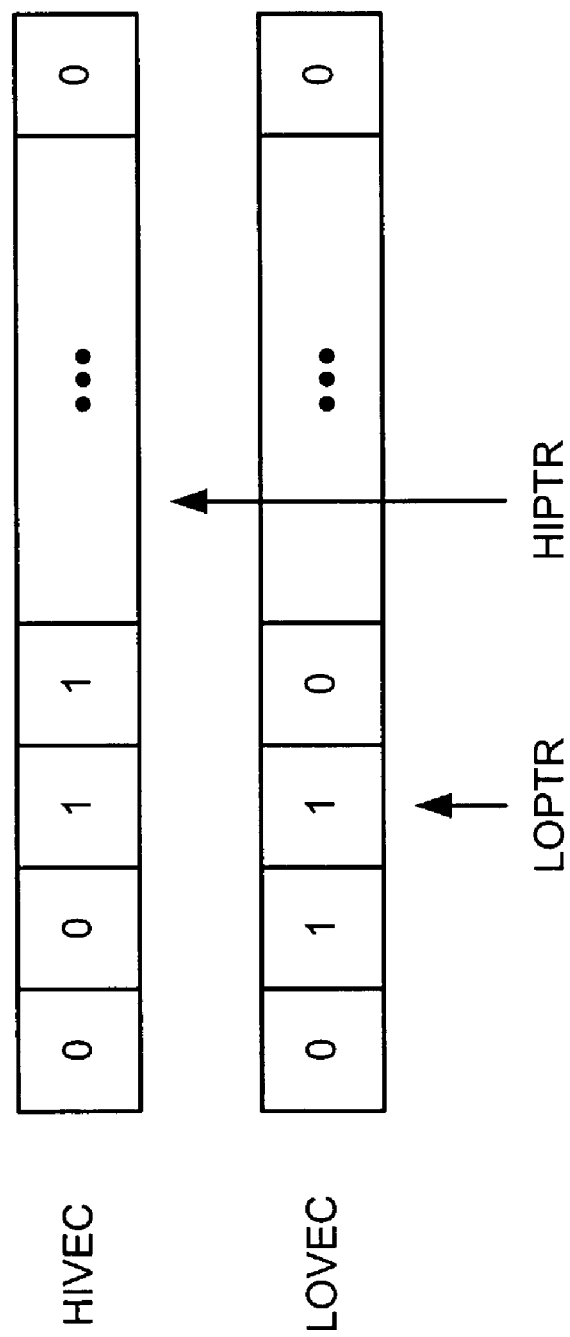
FIG. 12 is an exemplary diagram of queue selection using the HIVec and LOVec vectors according to an implementation consistent with the principles of the invention.

FIG. 12 is an exemplary diagram of queue selection using the HIVec and LOVec vectors according to an implementation consistent with the principles of the invention. Drop engine 630 may use the two bit vectors HIVec and LOVec to select the next queue to examine. Drop engine 630 may begin searching HIVec starting at the location after a pointer (HIPtr) looking for the first queue i that has HIVec[i]=1. If there is no such queue, then drop engine 630 may search LOVec starting at the location after a pointer (LOPtr) looking for the first queue that has LOVec[i]=1.

Returning to FIG. 11A, when drop engine 630 finds a queue i, it determines the variable dma (i.e., the average bandwidth used bu*Rtt) and, from it, the variable MAX (act 1115). As described above, MAX is defined as the maximum of the values of sma from static memory allocated RAM 710 and dma. From MAX, drop engine 630 generates an index (act 1120). As described above, the index may be defined as: mu/MAX*K. In an exemplary implementation, the generated index may be a six bit number.

Drop engine 630 may determine whether the packet contains an attribute, such as a keep alive attribute, that indicates that the packet should not be dropped (act 1125). The presence or absence of this packet attribute may be used to generate a DO NOT DROP signal. If the packet contains this attribute, drop engine 630 may mark the packet as not to be dropped (act 1130). Marking may be done by simply setting a bit associated with the packet or by not dropping packet information from the queue.

Drop engine 630 may compare mu/MAX with a first programmable threshold (T/H$_1$) (act 1135). If mu/MAX is less than or equal to T/H$_1$, drop engine 630 may mark the packet as not to be dropped (act 1130). For example, drop engine 630 may set a bit that indicates that the packet should not be dropped or may simply not drop packet information from the queue.

If mu/MAX is greater than T/H$_1$, drop engine 630 may determine whether mu/MAX is greater than or equal to 1 (act 1140). If mu/MAX is greater than or equal to 1, then drop engine 630 may mark the packet for dropping (act 1145). For example, drop engine 630 may set a bit that indicates that the packet should be dropped or may simply drop packet information from the queue.

If mu/MAX is less than the value of 1, then drop engine 630 may use the index to access drop profile 750 and obtain a drop probability (act 1150) (FIG. 11B). If drop profile 750 contains more than one profile table, drop engine 630 may use packet attributes to select one of the profile tables. Drop engine 630 may then use the index as an address into the selected profile table and read a drop probability value therefrom.

Figure 1:
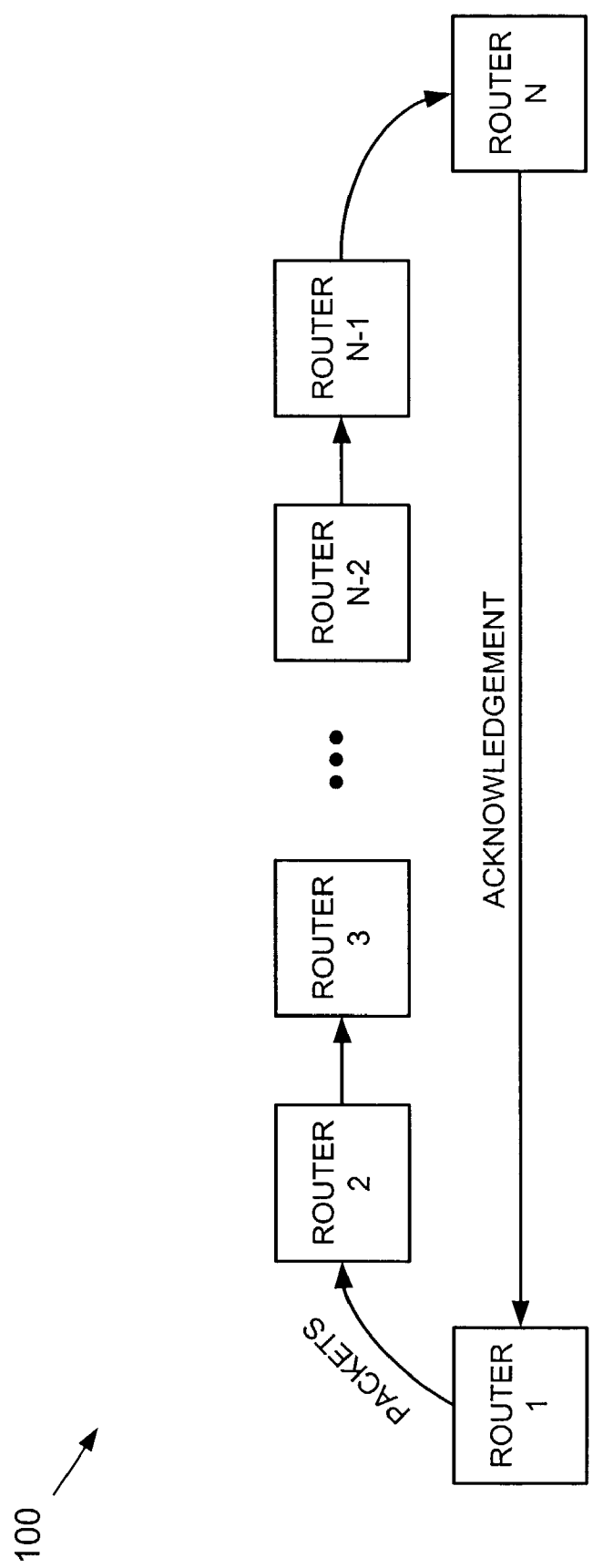
FIG. 1 is a diagram of a portion of a packet transmission network.
Figure 2:
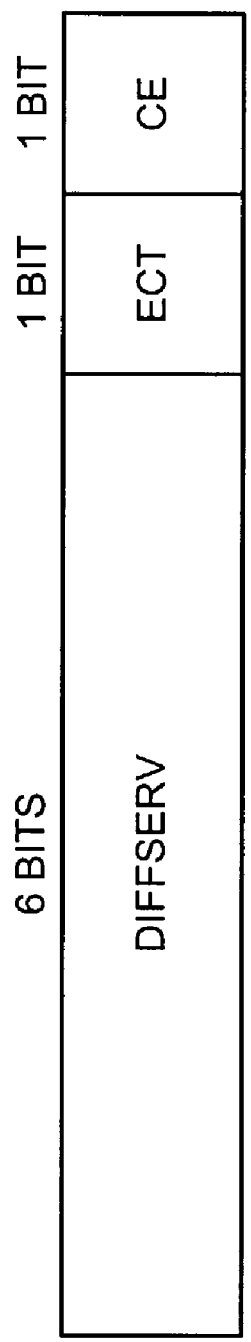
FIG. 2 is an exemplary diagram of a tag associated with a packet.

Drop engine 630 may determine whether to perform ECN or packet dropping based on a comparison of the drop probability value to a random number (acts 1155 and 1160). The random number may be generated by random number generator 910. If the drop probability value is not greater than the random number, then drop engine 630 may mark the packet as not to be dropped (act 1165). If the drop probability value is greater than the random number, then drop engine 630 may determine whether the packet is ECN capable (act 1170). Drop engine 630 may make this determination by analyzing the ECN capable (ECT) field of the packet (FIG. 2).

If the packet is not ECN capable, then drop engine 630 may mark the packet for dropping (act 1175). If the packet is ECN capable, however, then drop engine 630 may compare mu/MAX with a second programmable threshold (T/H$_2$) (act 1180). If mu/MAX is greater than T/H$_2$, then drop engine 630 may mark the packet for dropping. Marking may be done by simply setting a bit associated with the packet or by dropping packet information from the queue. In response to a decision to drop, drop engine 630 may remove the associated packet information from the queue. Alternatively, the queue may discard the packet information itself when instructed by drop engine 630.

If mu/MAX is less than or equal to T/H$_2$, then drop engine 630 may set one or more bits in the packet to indicate that congestion exists (act 1185). For example, drop engine 630 may set bit(s) of the CE field (FIG. 2). Drop engine 630 may then mark the packet as not to be dropped (act 1190). For example, drop engine 630 may set a bit that indicates that the packet should not be dropped or may simply not drop packet information from the queue.

CONCLUSION

Systems and methods, consistent with the principles of the invention, selectively use and/or combine explicit congestion notification (ECN) and packet dropping techniques to improve congestion control and avoid attacks. The systems and methods provide one or more programmable thresholds that facilitate the determination as to whether to use ECN or packet dropping techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, dequeue engine 620 and drop engine 630 have been described as separate components. In other implementations consistent with the principles of the invention, the engines may be integrated into a single engine that both dequeues and drops packet information.

Also, while some memory elements have been described as RAMs, other types of memory devices may be used in other implementations consistent with the principles of the invention.

Further, first and second thresholds have been described as being used in determining whether to perform selective explicit congestion notification and selective packet dropping. In other implementations consistent with the principles of the invention, more or fewer thresholds may be used.

Certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A system for providing congestion control, comprising:
   a plurality of queues to temporarily store data, a value being associated with each of the queues, each of the values relating to an amount of memory associated with the queue; and
   a drop engine to:
   compare the value associated with a particular one of the queues to first and second programmable thresholds,
   perform selective explicit congestion notification on data in the particular queue based on a first drop probability when the value is greater than the first threshold but less than or equal to the second threshold, and perform selective dropping of the data in the particular queue based on a second drop probability when the value is greater than the second threshold.

2. The system of claim 1, wherein the value relates to an amount of memory used by the particular queue.

3. The system of claim 1, wherein the value relates to an amount of memory allocated to the particular queue.

4. The system of claim 1, wherein the value relates to an amount of memory used by the particular queue divided by a maximum of an amount of memory statically and dynamically allocated to the particular queue.

5. The system of claim 1, wherein when performing selective dropping of the data, the drop engine:
obtains the second drop probability corresponding to the particular queue, and
determines whether to drop the data based on the second drop probability.

6. The system of claim 5, further comprising:
a drop table configured to store a plurality of the second drop probabilities.

7. The system of claim 6, wherein when obtaining the second drop probability, the drop engine:
generates an index for the drop table based on an amount of memory used by the particular queue, and
reads one of the second drop probabilities from the drop table using the generated index.

8. The system of claim 7, wherein when selectively dropping the data, the drop engine:
compares the second drop probability with a random number, and
generates a drop decision based on a result of the comparison.

9. The system of claim 1, wherein when performing selective dropping of the data, the drop engine:
determines whether the data includes an attribute that indicates that the data should not be dropped, and
marks the data as not to be dropped when the data includes the attribute.

10. The system of claim 1, wherein when the value is less than or equal to the first threshold, the drop engine is configured to:
perform no explicit congestion notification and no dropping of the data in the particular queue.

11. The system of claim 1, wherein when performing selective explicit congestion notification, the drop engine:
obtains the first drop probability corresponding to the particular queue, and
determines whether to perform the explicit congestion notification based on the first drop probability.

12. The system of claim 11, wherein when performing explicit congestion notification, the drop engine:
sets a field relating to the data to indicate that congestion exists, and
marks the data for transmission without being dropped.

13. The system of claim 1, wherein when the value is greater than a predetermined value that is greater than the second threshold, the drop engine:
drops the data from the particular queue.

14. A method for providing congestion control, comprising:
temporarily storing data in a plurality of queues;
associating a value with each of the queues, each of the values relating to an amount of memory associated with the queue;
comparing the value associated with a particular one of the queues to first and second programmable thresholds;
performing no explicit congestion notification and no dropping of data in the particular queue when the value is less than or equal to the first threshold;
selectively performing explicit congestion notification on data in the particular queue when the value is greater than the first threshold but less than or equal to the second threshold; and
selectively performing dropping of data in the particular queue when the value is greater than the second threshold.

15. The method of claim 14, wherein each of the values relates to an amount of memory used by the associated queue.

16. The method of claim 14, wherein each of the values relates to an amount of memory allocated to the associated queue.

17. The method of claim 14, wherein each of the values relates to an amount of memory used by the associated queue divided by a maximum of an amount of memory statically and dynamically allocated to the associated queue.

18. The method of claim 14, wherein the selectively performing dropping of the data includes:
obtaining a drop probability corresponding to the particular queue, and
determining whether to drop the data based on the drop probability.

19. The method of claim 18, further comprising:
providing a drop table configured to store a plurality of drop probabilities.

20. The method of claim 19, wherein the obtaining a drop probability includes:
generating an index for the drop table based on an amount of memory used by the particular queue, and
reading one of the drop probabilities from the drop table using the generated index.

21. The method of claim 20, wherein the selectively performing dropping of the data includes:
comparing the drop probability with a random number, and
generating a drop decision based on a result of the comparison.

22. The method of claim 14, wherein the selectively performing dropping of the data includes:
determining whether the data includes an attribute that indicates that the data should not be dropped, and
marking the data as not to be dropped when the data includes the attribute.

23. The method of claim 14, wherein the selectively performing explicit congestion notification includes:
obtaining a drop probability corresponding to the particular queue, and
determining whether to perform the explicit congestion notification based on the drop probability.

24. The method of claim 23, wherein the selectively performing explicit congestion notification further includes:
setting a field relating to the data to indicate that congestion exists, and
marking the data for transmission without being dropped.

25. The method of claim 14, further comprising:
dropping the data from the particular queue when the value is greater than a predetermined value that is greater than the second threshold.

26. A network device, comprising:
a switching fabric;

a first processor to:
  receive data from a network, and
  transmit data to the network;
a second processor to:
  receive data from the switching fabric, and
  transmit data to the switching fabric; and
a memory subsystem to facilitate communication between the first processor and the second processor, the memory subsystem comprising:
  a plurality of queues for temporarily storing the data received by the first and second processors, a value being associated with each of the queues, each of the values relating to an amount of memory associated with the queue,
  a dequeue engine configured to dequeue data from the queues, and
  a drop engine to:
    compare the value associated with a particular one of the queues to first and second programmable thresholds,
    perform no explicit congestion notification and no dropping of data in the particular queue when the value is less than or equal to the first threshold,
    selectively perform explicit congestion notification on data in the particular queue when the value is greater than the first threshold but less than or equal to the second threshold, and
    selectively drop data in the particular queue when the value is greater than the second threshold.

27. A method comprising:
determining an amount of memory associated with one of a plurality of queues;
generating a value based on the amount of memory associated with the queue;
comparing the value to first and second programmable thresholds;
performing no explicit congestion notification and no dropping of data in the queue when the value is less than or equal to the first threshold;
performing selective explicit congestion notification on data in the queue when the value is greater than the first programmable threshold but less than or equal to the second programmable threshold; and
selectively dropping data from the queue when the value is greater than the second programmable threshold.

28. The method of claim 27, wherein the performing selective explicit congestion notification includes:
obtaining the first drop probability corresponding to the queue, and
determining whether to perform the explicit congestion notification based on the first drop probability.

29. The method of claim 28, wherein the performing selective explicit congestion notification further includes:
setting a field relating to the data to indicate that congestion exists, and
marking the data for transmission without being dropped.

30. The method of claim 27, wherein the selectively dropping the data includes:
obtaining a second drop probability corresponding to the queue, and
determining whether to drop the data based on the second drop probability.

31. The method of claim 30, wherein the selectively dropping the data includes:
comparing the drop probability with a random number, and
generating a drop decision based on a result of the comparison.

32. The method of claim 27, wherein the selectively dropping the data includes:
determining whether the data includes an attribute that indicates that the data should not be dropped, and
marking the data as not to be dropped when the data includes the attribute.

33. A device for performing congestion control, comprising:
a plurality of queues to temporarily store data; and
a drop engine to:
  determine an amount of memory associated with a first one of the queues,
  generate a value based on the amount of memory associated with the first queue,
  compare the value to first and second programmable thresholds,
  perform no explicit congestion notification and no packet dropping on the data in the first queue when the value is less than or equal to the first threshold,
  perform selective explicit congestion notification on the data in the first queue when the value is greater than the first threshold but less than or equal to the second threshold, and
  selectively drop the data in the first queue when the value is greater than the second threshold.

34. The device of claim 33, wherein when performing selective explicit congestion notification, the drop engine:
obtains a drop probability corresponding to the first queue, and
determines whether to perform explicit congestion notification based on the drop probability.

35. The device of claim 34, wherein when performing explicit congestion notification, the drop engine:
sets a field relating to the data to indicate that congestion exists, and
marks the data for transmission without being dropped.

36. The device of claim 33, wherein when selectively dropping the data, the drop engine:
obtain a drop probability corresponding to the first queue, and
determine whether to drop the data based on the drop probability.

37. The device of claim 36, wherein when selectively dropping the data, the drop engine:
compares the drop probability with a random number, and
generates a drop decision based on a result of the comparison.

38. The device of claim 33, wherein when selectively dropping the data, the drop engine:
determine whether the data includes an attribute that indicates that the data should not be dropped, and
marks the data as not to be dropped when the data includes the attribute.

39. The device of claim 33, wherein the drop engine:
drops the data from the first queue when the value is greater than a predetermined value that is greater than the second threshold.

40. The device of claim 33, wherein the selective dropping occurs to protect the device from denial of service attacks.

* * * * *